US011880011B2

(12) United States Patent
Zheng et al.

(10) Patent No.: US 11,880,011 B2
(45) Date of Patent: Jan. 23, 2024

(54) SURFACE WAVE PREDICTION AND REMOVAL FROM SEISMIC DATA

(71) Applicant: University of Houston System, Houston, TX (US)

(72) Inventors: Yingcai Zheng, Houston, TX (US); Hao Hu, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 509 days.

(21) Appl. No.: 17/267,555

(22) PCT Filed: Aug. 7, 2019

(86) PCT No.: PCT/US2019/045391
§ 371 (c)(1),
(2) Date: Feb. 10, 2021

(87) PCT Pub. No.: WO2020/033465
PCT Pub. Date: Feb. 13, 2020

(65) Prior Publication Data
US 2021/0311218 A1    Oct. 7, 2021

Related U.S. Application Data

(60) Provisional application No. 62/717,456, filed on Aug. 10, 2018.

(51) Int. Cl.
*G06F 11/30*    (2006.01)
*G01V 1/36*    (2006.01)
*G01V 1/28*    (2006.01)

(52) U.S. Cl.
CPC .............. *G01V 1/364* (2013.01); *G01V 1/282* (2013.01); *G01V 2210/20* (2013.01);
(Continued)

(58) Field of Classification Search
CPC ...................................................... G01V 1/364
See application file for complete search history.

(56) References Cited

U.S. PATENT DOCUMENTS

| 5,572,483 A | 11/1996 | Chambers et al. |
| 7,917,295 B2 | 3/2011 | Strobbia |

(Continued)

FOREIGN PATENT DOCUMENTS

CN    104614769 A    5/2015

OTHER PUBLICATIONS

Notification of Transmittal of the International Search Report and Written Opinion of the International Search Authority The European Patent Office—dated Nov. 14, 2019 for International Application No. PCT/US2019/045391, 37 pages.

(Continued)

*Primary Examiner* — Phuong Huynh
(74) *Attorney, Agent, or Firm* — Jackson Walker LLP

(57) ABSTRACT

The present method predicts and separates dispersive surface waves from seismic data using dispersion estimation and is completely data-driven and computer automated and no human intervention is needed. The method is capable of predicting and suppressing surface waves from recorded seismic data without damaging the reflections. Nonlinear signal comparison (NLSC) is used to obtain a high resolution and accurate dispersion. Based on the dispersion, surface waves are predicted from the field recorded seismic data. The predicted surface waves are then subtracted from the original data.

6 Claims, 8 Drawing Sheets

(52) U.S. Cl.
 CPC .. *G01V 2210/3246* (2013.01); *G01V 2210/34* (2013.01); *G01V 2210/614* (2013.01)

(56) References Cited

U.S. PATENT DOCUMENTS

| | | | |
|---|---|---|---|
| 10,422,906 | B2 | 9/2019 | Boiero |
| 2009/0276159 | A1* | 11/2009 | Strobbia ............... G01V 1/364 702/17 |

OTHER PUBLICATIONS

Li, et al., "Removal of dispersive borehole waves and beam imaging of fractures around the wellbore using sonic logging data", SEG International Exposition and 88th Annual Meeting, 2018, 6 pages.
Notification of Transmittal of the International Preliminary Report on Patentability dated Feb. 25, 2021 by the International Bureau of WIPO for International Application No. PCT/US2019/045391, 9 pages.
Embree, et al., "Wide-Band Velocity Filtering—The Pie-Slice Process", Geophysics, vol. XXVIII, No. 6, Dec. 1963, pp. 948-974.
Claerrbout, J., "Slant-stacks and radial traces", Stanford Exploration Project report, 1975, 76 pages.
Herrin, et al., "Phase-Matched Filters: Application to the Study of Rayleigh Waves", Bulletin of the Seismological Society of America, vol. 67, No. 5, Oct. 1977, pp. 1259-1275.
Hemon, et al., "Use of the Karhunen—Loeve Transformation in Seismic Data-Processing", Bulletin of the Seismological Society of America, 67, No. 5, 1978, pp. 1259-1275.
Goforth, et al., "Phase-Matched Filters: Application to the Study of Love Waves", Bulletin of the Seismological Society of America, vol. 69, No. 1, Feb. 1979, pp. 27-44.
McMechan, et al., "Analysis of dispersive waves by wave field transformation", Geophysics, 46, No. 6, 1981, pp. 869-874.
Canales, et al., "Random Noise Reduction", SEG Technical Program Expanded Abstracts 1984: Society of Exploration Geophysicists, pp. 525-527.
Goebel, V., "Polarization and Ground Roll Suppression", Geophysics, 50, No. 7, 1985, pp. 1202-1202.
Gulunay, N., "FXDECON and Complex Wiener Prediction Filter", SEG Technical Program Expanded Abstracts 1986: Society of Exploration Geophysicists, pp. 279-281.
Beresford-Smith, et al., "Dispersive noise removal in t-x space: Application to Arctic data", 1988, Geophysics, 53, No. 3, pp. 346-358.
Freire, et al., "Application of singular value decomposition to vertical seismic profiling", Geophysics, 53, No. 6, 1988, pp. 778-785.
Morse, et al., "Ground-roll suppression by the stackarray", Geophysics, 54, No. 3, 1989, pp. 290-301.
Hermann, et al., "Ground roll: Rejection using adaptive phase-matched filters", Geophysics, 55, No. 6, 1990, pp. 776-781.
Turner, G., "Aliasing in the tau-p transform and the removal of spatially aliased coherent noise", Geophysics, 55, No. 11, 1990, pp. 1496-1503.
Russell, et al., "Noise elimination and the Radon transform, part 1", The Leading Edge, 9, No. 10, 1990, pp. 18-23.
Russell, et al., "Noise elimination and the Radon transform, part 2", The Leading Edge, 9, No. 11, 1990, pp. 31-37.
Shieh, et al., "Ground roll: Rejection using polarization filters", Geophysics, 55, No. 9, 1990, pp. 1216-1222.
Al-Yahya, et al., "Application of the Partial Karhunen-Loeve Transform to Suppress Random Noise in Seismic Sections", Geophysical Prospecting, 39, No. 1, 1991, pp. 77-93.
McMechan, et al., "Depth filtering of first breaks and ground roll", Geophysics, 56, No. 3, 1991, pp. 390-396.
Claerrbout, et al., "Earth Soundings Analysis: Processing versus Inversion", vol. 6: Blackwell Scientific Publications, Mar. 23, 2004, 334 pages.

Song, et al., "Ground roll rejection via f-v filtering", SEG Technical Program Expanded Abstracts 1993: Society of Exploration Geophysicists. pp. 1322-1325.
Schieck, David G., "Rayleigh-Wave Analysis and Removal Using a Novel Weighted Median Filter", Geology and Geophysics, University of Calgary, Nov. 1993, 139 pages.
Duncan, et al., "Median filter behaviour with seismic data", Geophysical prospecting, 43, No. 3, 1995, pp. 329-345.
Stockwell, et al., "Localization of the Complex Spectrum: The S Transform", IEEE Transactions on Signal Processing, vol. 44, No. 4, Apr. 1996, pp. 998-1001.
Alsdorf, Douglas, "Noise reduction in seismic data using Fourier correlation coefficient filtering", Geophysics, vol. 62, No. 5, 1997, pp. 1617-1627.
Deighan, et al., "Ground-roll suppression using the wavelet transform", Geophysics, vol. 62, No. 6, 1997, pp. 1896-1903.
Grubb, et al., "Characterizing seismic time series using the discrete wavelet transform", Geophysical Prospecting, 45, No. 2, 1997, pp. 183-205.
Komatitsch, et al., "The Spectral Element Method: An Efficient Tool to Simulate the Seismic Response of 2D and 3D Geological Structures", Bulletin of the Seismological Society of America, vol. 88, No. 2, Apr. 1988, pp. 368-392.
Liu, X., "Ground roll supression using the Karhunen-Louve transform", Geophysics, vol. 64, No. 2, 1999, pp. 564-566.
Xia, et al., "Estimation of near-surface shear-wave velocity by inversion of Rayleigh waves", Geophysics, vol. 64, No. 3, 1999, pp. 691-700.
Van der Baan, et al., "Neural networks in geophysical applications", Geophysics, vol. 65, No. 4, 2000, pp. 1032-1047.
Fomel, S., "Applications of plane-wave destruction filters", Geophysics, vol. 67, No. 6, 2002, pp. 1946-1960.
Komatitsch, et al., "Spectral-element simulations of global seismic wave propagation—II. Three-dimensional models, oceans, rotation and self-gravitation", Geophysical Journal International, 2002, 150, No. 1, pp. 303-318.
Henley, D., "Coherent noise attenuation in the radial trace domain", Geophysics, vol. 68, No. 4, 2003, pp. 1408-1416.
Pinnegar, et al., "Application of the S transform to prestack noise attenuation filtering", Journal of Geophysical Research, vol. 108, No. B9. 2003, 10 pages.
Askari, et al., "Ground roll attenuation using the S and x-f-k transforms", Geophysical Prospecting, 56, No. 1, 2008, pp. 105-114.
Liu, et al., "Stacking seismic data using local correlation", Geophysics, vol. 74, No. 3, 2009, 6 pages.
Melo, et al., "Ground-roll attenuation using a 2D time derivative filter", Geophysical Prospecting, 57, No. 3, 2009, pp. 343-353.
Halliday, et al., "Interferometric ground-roll removal: Attenuation of scattered surface waves in single-sensor data", Geophysics, vol. 75, No. 2, 2010, 11 pages.
Porsani, et al., "SVD filtering applied to ground-roll attenuation", Journal of Geophysics and Engineering, vol. 7, No. 3, 2010, pp. 284-289.
Jing-Jing, et al., "The surface wave suppression using the second generation curvelet transform", Applied Geophysics, vol. 7, No. 4, Dec. 2010, pp. 325-335.
Strobbia, et al., "Model-based coherent noise attenuation for complex dispersive waves", SEG Technical Program Expanded Abstracts, 2011: Society of Exploration Geophysicists. pp. 3571-3575.
Strobbia, et al., "Surface waves: use them then lose them. Surface-wave analysis, inversion and attenuation in land reflection seismic surveying", Near Surface Geophysics, 9, No. 6, 2011, pp. 503-514.
Tiapkina, et al., "Single-station SVD-based polarization filtering of ground roll: Perfection and investigation of limitations and pitfalls", Geophysics, vol. 77, No. 2, 2012, 19 pages.
Wang, et al., "Data adaptive ground-roll attenuation via sparsity promotion", Journal of Applied Geophysics, 83, 2012, pp. 19-28.
Goudarzi, et al., "Adaptive seismic ground roll attenuation using the double density dual tree discrete wavelet transform (DWT) method", Earth Sciences Research Journal, 16, No. 2, Dec. 2012, pp. 31-38.

(56) References Cited

OTHER PUBLICATIONS

Hai-Feng, et al., "Robust adaptive polarization analysis method for eliminating ground roll in 3C land seismics", Applied Geophysics, vol. 10, No. 3, Sep. 2013, pp. 295-304.

Hermann, R. B., "Computer Programs in Seismology: An Evolving Tool for Instruction and Research", Seismological Research Letters, vol. 84, No. 6, 2013, pp. 1081-1088.

Liu, et al., "Seismic data analysis using local time-frequency decomposition", Geophysical Prospecting, 61, No. 3, 2013, pp. 516-525.

Yu-Yang, et al., "Ground roll attenuation using a time-frequency dependent polarization filter based on the S transform", Applied Geophysics, vol. 10, No. 3, 2013, pp. 279-294.

Hu, et al., A novel measurement of the surface wave dispersion with high and adjustable resolution: Multi-channel nonlinear signal comparison:, Journal of Applied Geophysics, 160, 2019, pp. 236-241.

Hu, et al., "Data-driven dispersive surface-wave prediction and mode separation using high-resolution dispersion estimation", Journal of Applied Geophysics, 171, 2019, 10 pages.

Li, et al., "Gaussian beam imaging of fractures near the wellbore using sonic logging tools after removing dispersive borehole waves", Geophysics, vol. 85, No. 4, 2020, pp. D133-D143.

Lin, et al., "High-resolution 3D shallow crustal structure in Long Beach, California: Application of ambient noise tomography on a dense seismic array", Geophysics, vol. 78, No. 4, 2013, pp. Q45-Q56.

Mortazavi, et al., "The Effect of Signal-to-Noise Ratio on Ground Roll Attenuation Using Adaptive Singular Value Decomposition: A Case Study from the South West of Iran", Journal of Seismic Exploration, 22, No. 5, 2013, pp. 427-447.

Halliday, et al., "Scattered ground-roll attenuation using model-driven interferometry", Geophysical Prospecting, 63, No. 1, 2015, pp. 116-132.

Hu, et al., "Compression of local slant stacks by the estimation of multiple local slopes and the matching pursuit decomposition", Geophysics, vol. 80, No. 6, 2015, pp. WD175-WD187.

Hosseini, et al., "Adaptive attenuation of aliased ground roll using the shearlet transform", Journal of Applied Geophysics, 112, 2015, pp. 190-205.

Hosseini, et al., "Shearlet transform in aliased ground roll attenuation and its comparison with f-k filtering and curvelet transform", Journal of Geophysics and Engineering, 12, No. 3, 2015, pp. 351-364.

Nakata, et al., "Body wave extraction and tomography at Long Beach, California, with ambient-noise interferometry", Journal of Geophysical Research: Solid Earth, 120, No. 2, 2015, pp. 1159-1173.

Soares, et al., "Artificial neural networks applied to reduce the noise type of ground roll", Journal of Seismic Exploration, 24, No. 1, 2015, pp. 1-14.

De-Ying, et al., "Phase-shift- and phase-filtering-based surface-wave suppression method", Applied Geophysics, vol. 13, No. 4, Dec. 2016, pp. 614-620.

Hu, et al., "Ground-roll noise extraction and suppression using high-resolution linear Radon transform", Journal of Applied Geophysics, 128, 2016, pp. 8-17.

Naghadeh, et al., "Ground roll attenuation using SVD and time-frequency-wavenumber filters", Journal of Geophysics and Engineering, 13, No. 5, 2016, pp. 657-665.

Rastegar, et al. "Ground-roll attenuation using modified common-offset-common-reflection-surface stacking", Applied Geophysics, vol. 13, No. 2, Jun. 2016, pp. 353-363.

Verma, et al., "Highly aliased ground-roll suppression using a 3D multiwindow Karhunen-Loeve filter: Application to a legacy Mississippi Lime survey", Geophysics, vol. 81, No. 1, 2016, pp. V79-V88.

Xiao-Hong, et al., "Ground-roll separation of seismic data based on morphological component analysis in two-dimensional domain", Applied Geophysics, vol. 13, No. 1, Mar. 2016, pp. 116-126.

Wan-Li, et al., "Ground roll wave suppression based on wavelet frequency division and radial trace transform", Applied Geophysics, vol. 14, No. 1, Mar. 2017, pp. 96-104.

Zheng, et al., "Nonlinear Signal Comparison and High-Resolution Measurement of Surface-Wave Dispersion", Bulletin of the Seismological Society of America, vol. 107, No. 3, Jun. 2017, pp. 1551-1556.

\* cited by examiner

FIG. 1(a)-(b)
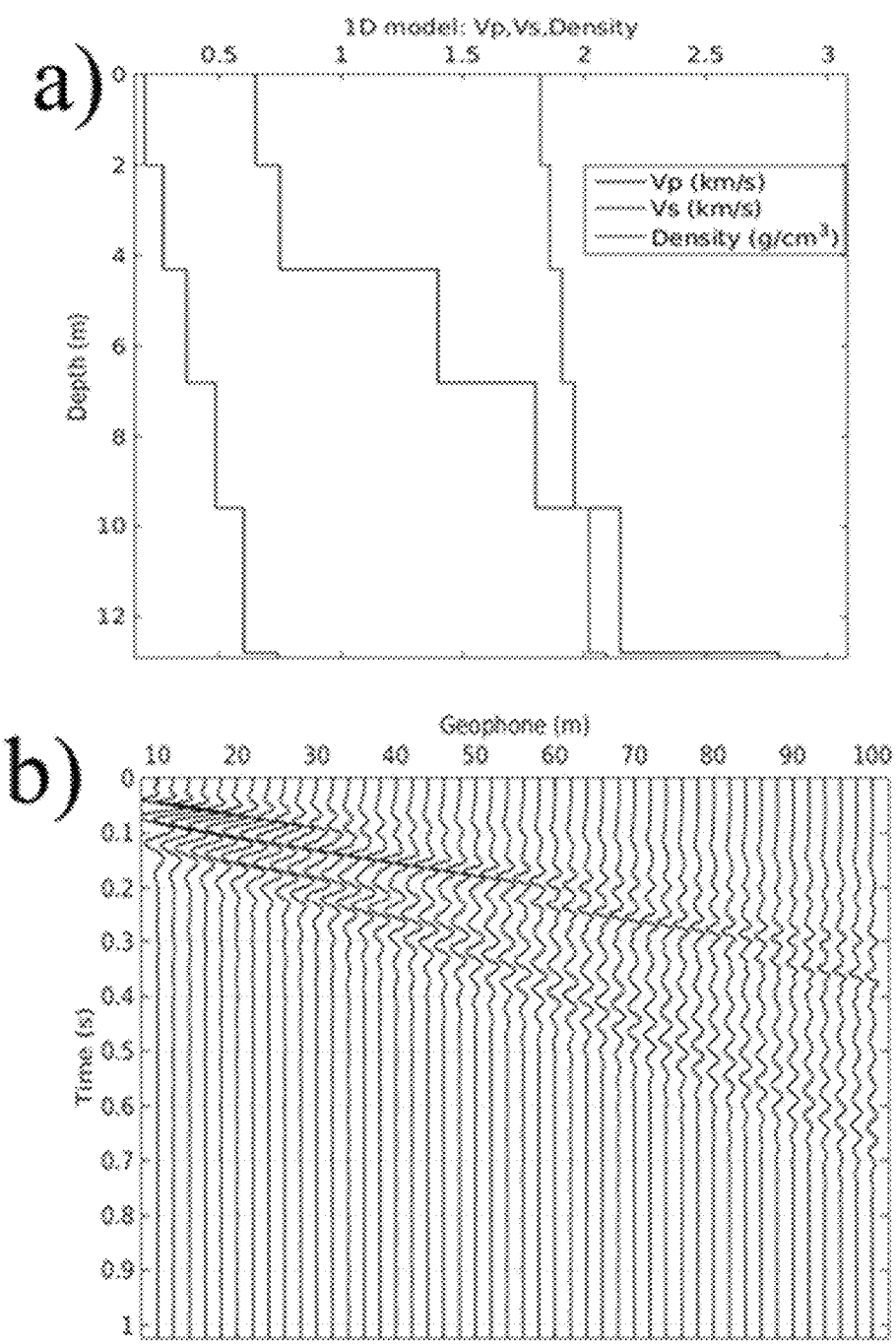

FIG. 1(c)-(d)
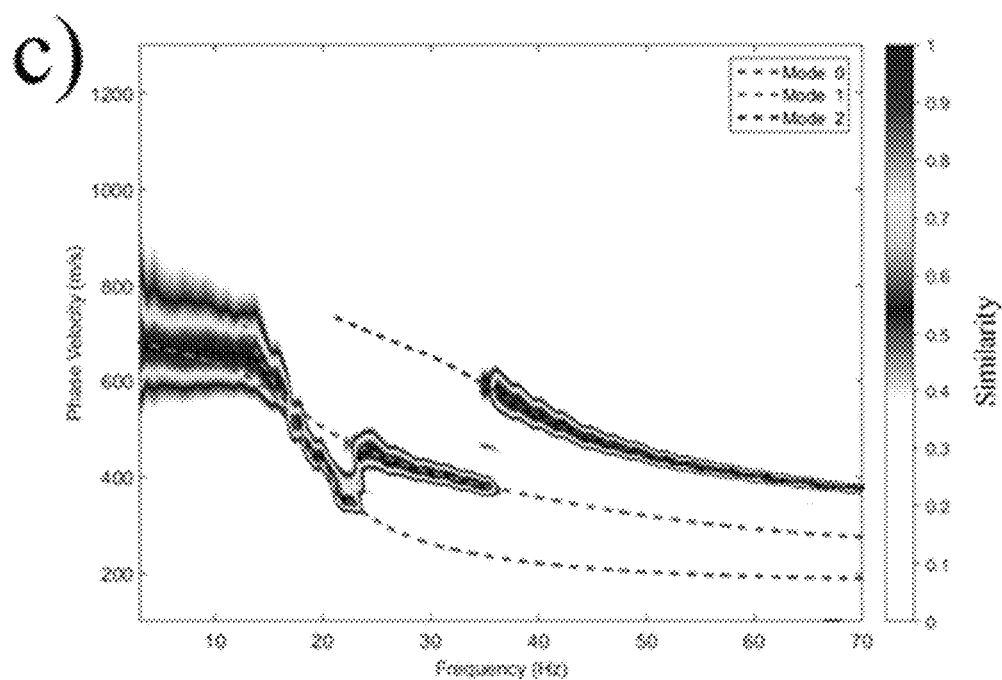
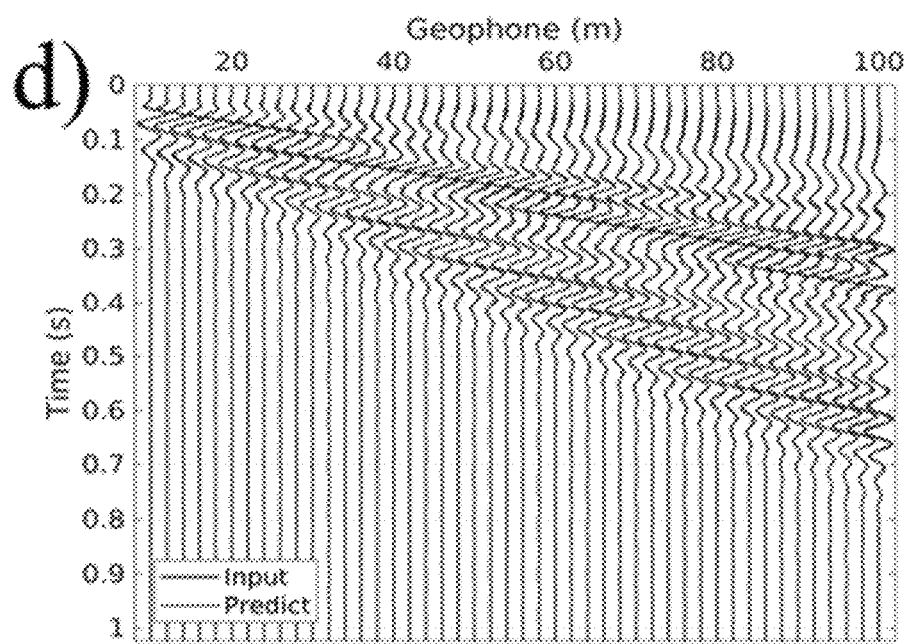

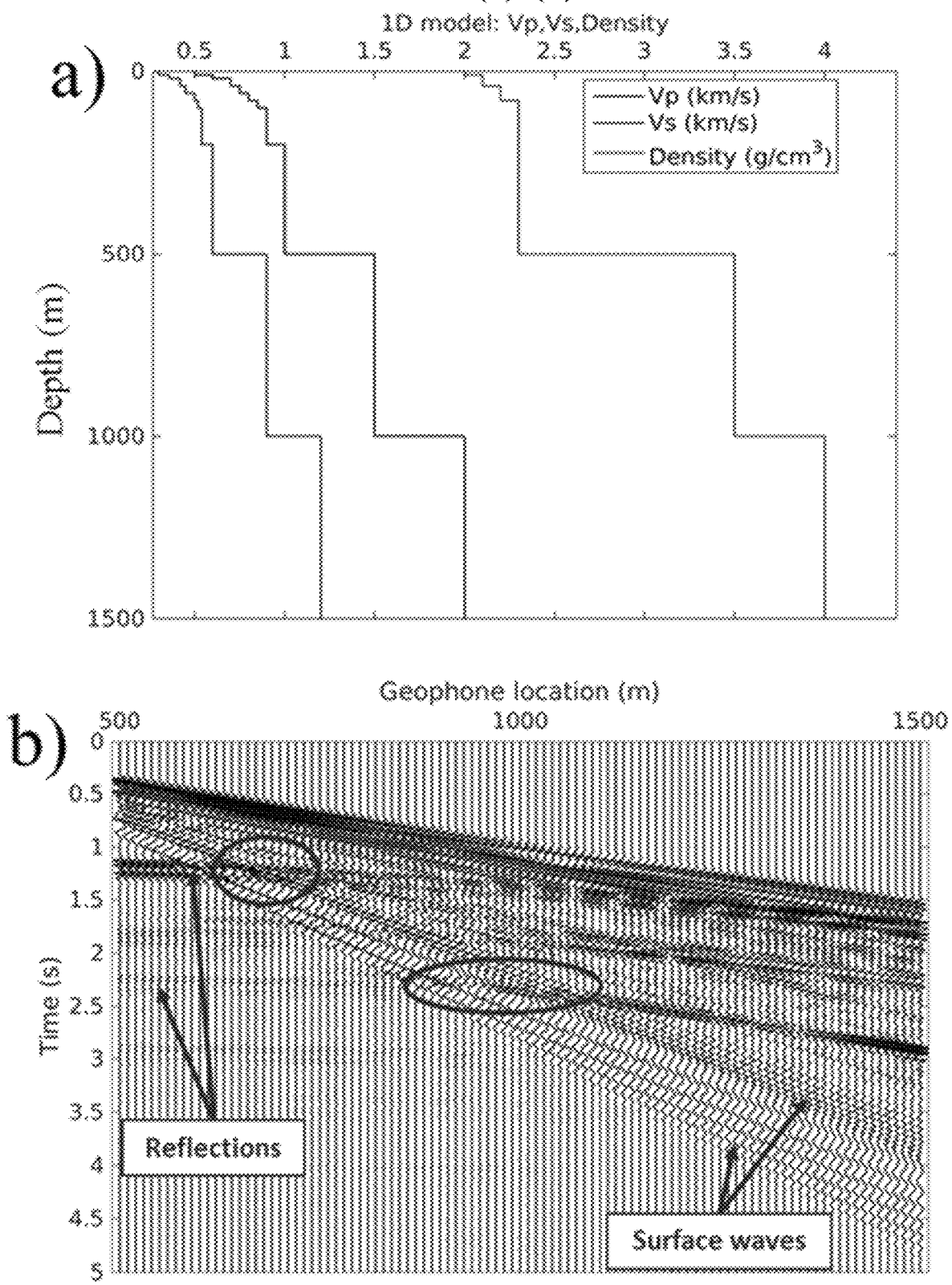
FIG. 2(a)-(b)

FIG. 2(c)-(d)
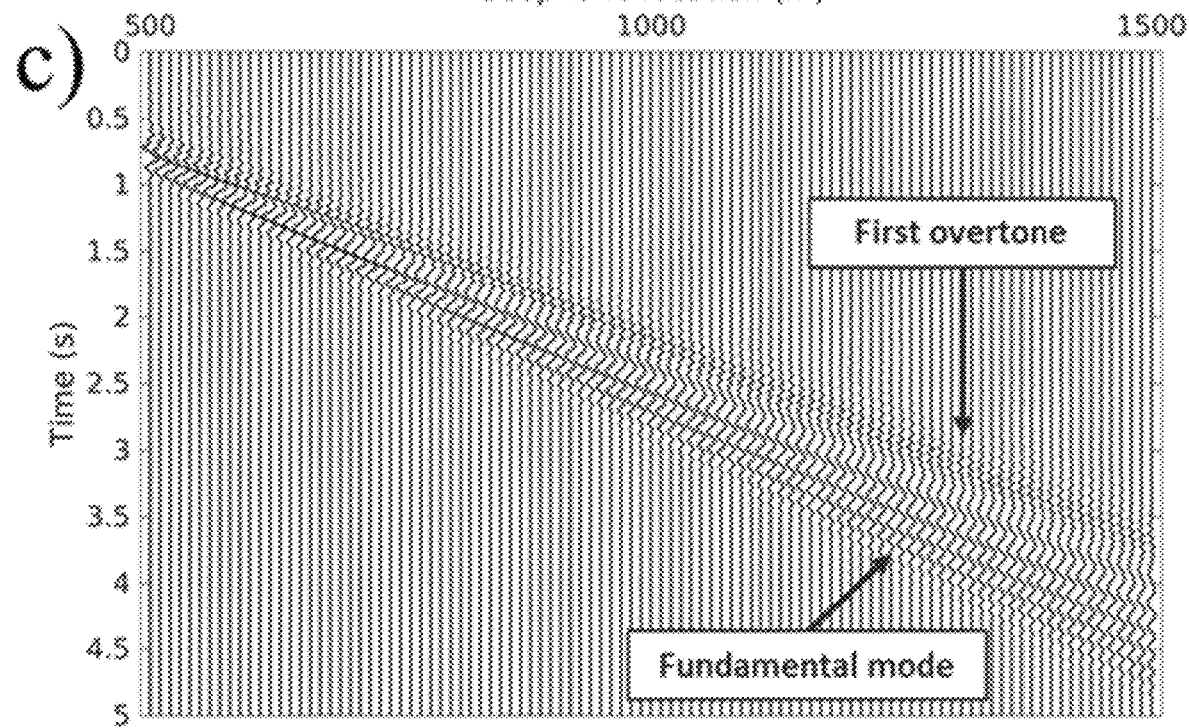
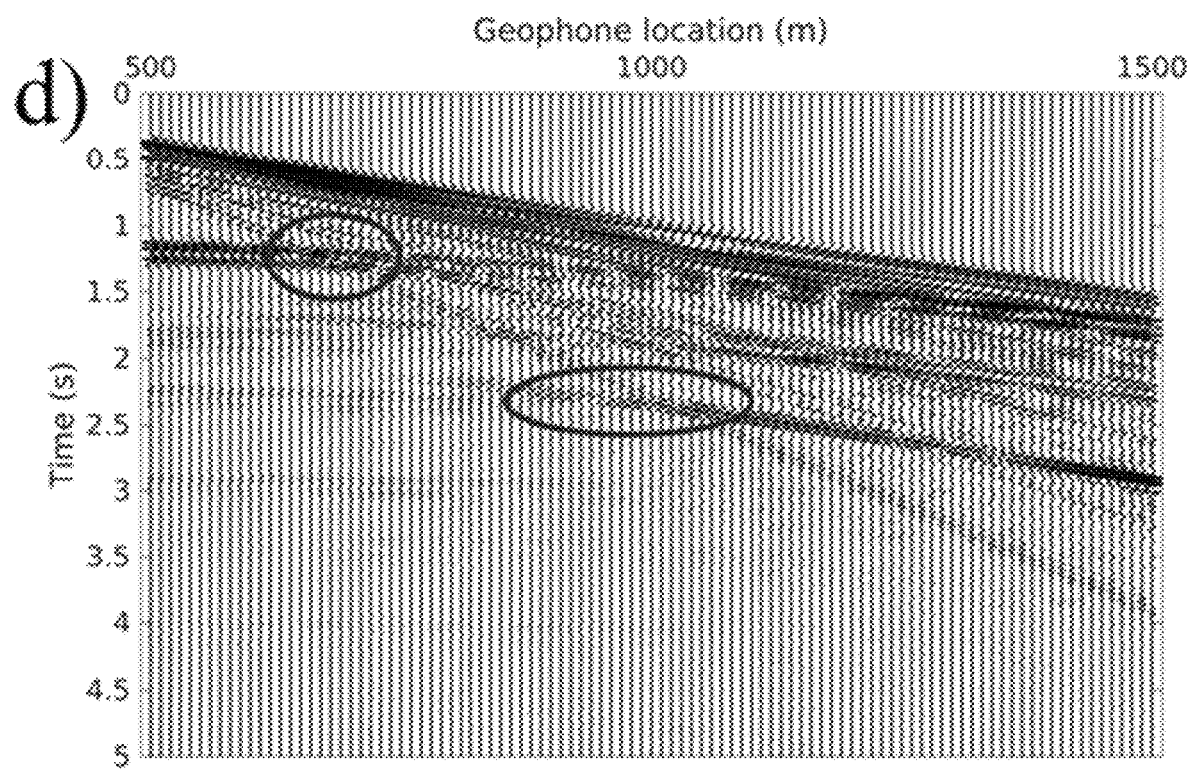

FIG. 3(a)-(b)
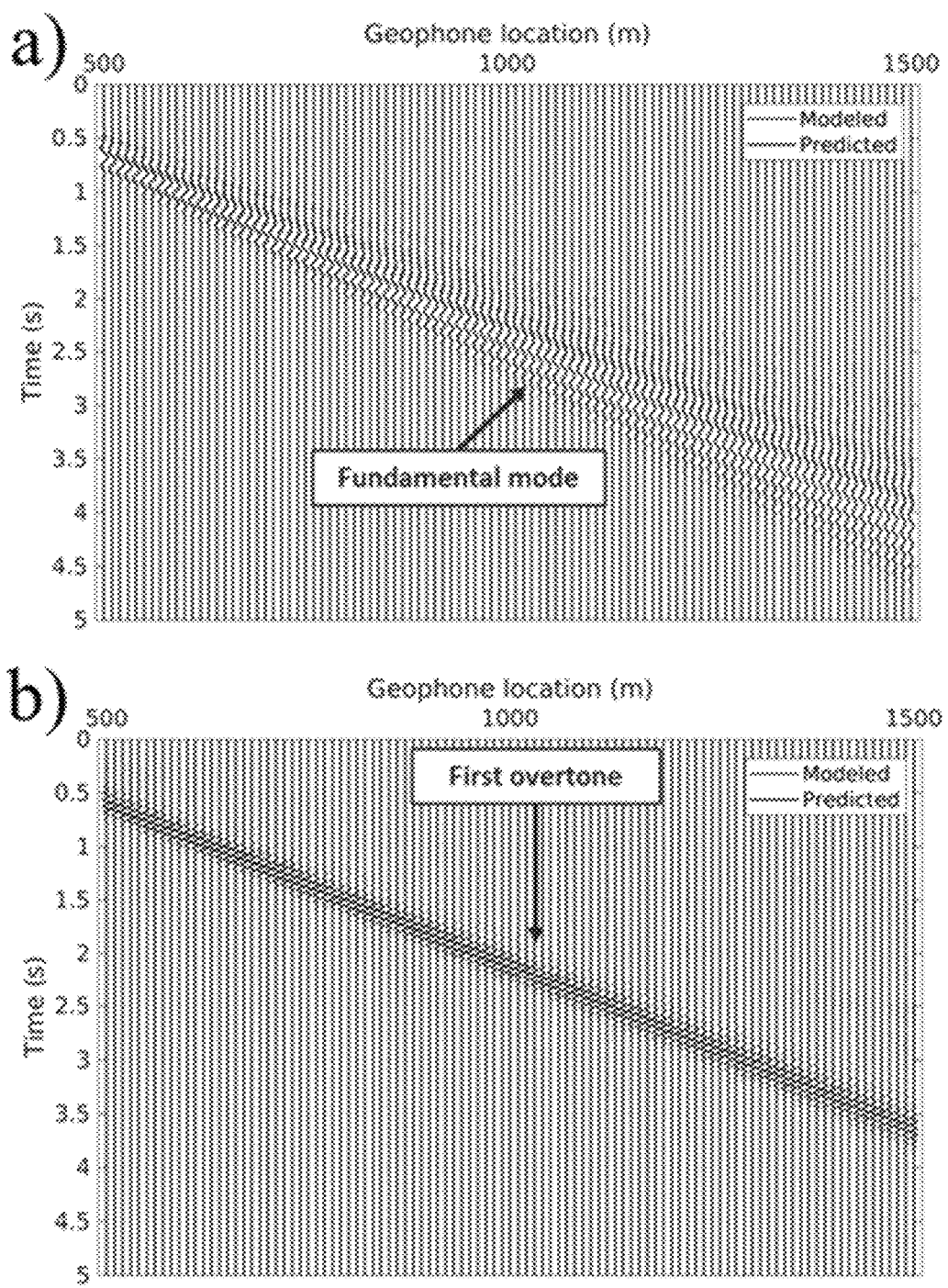

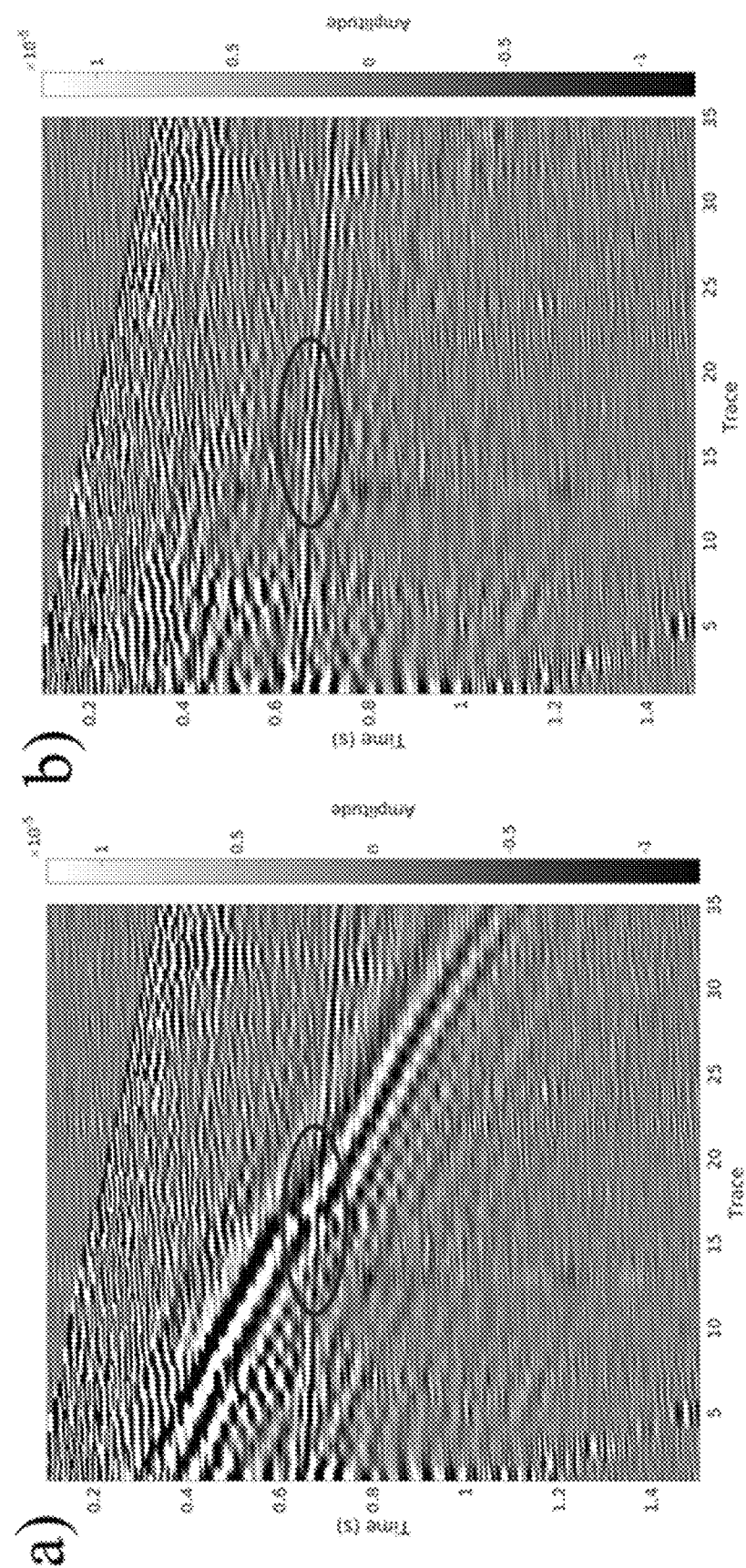
FIG. 4(a)-(b)

FIG. 4(c)-(d)
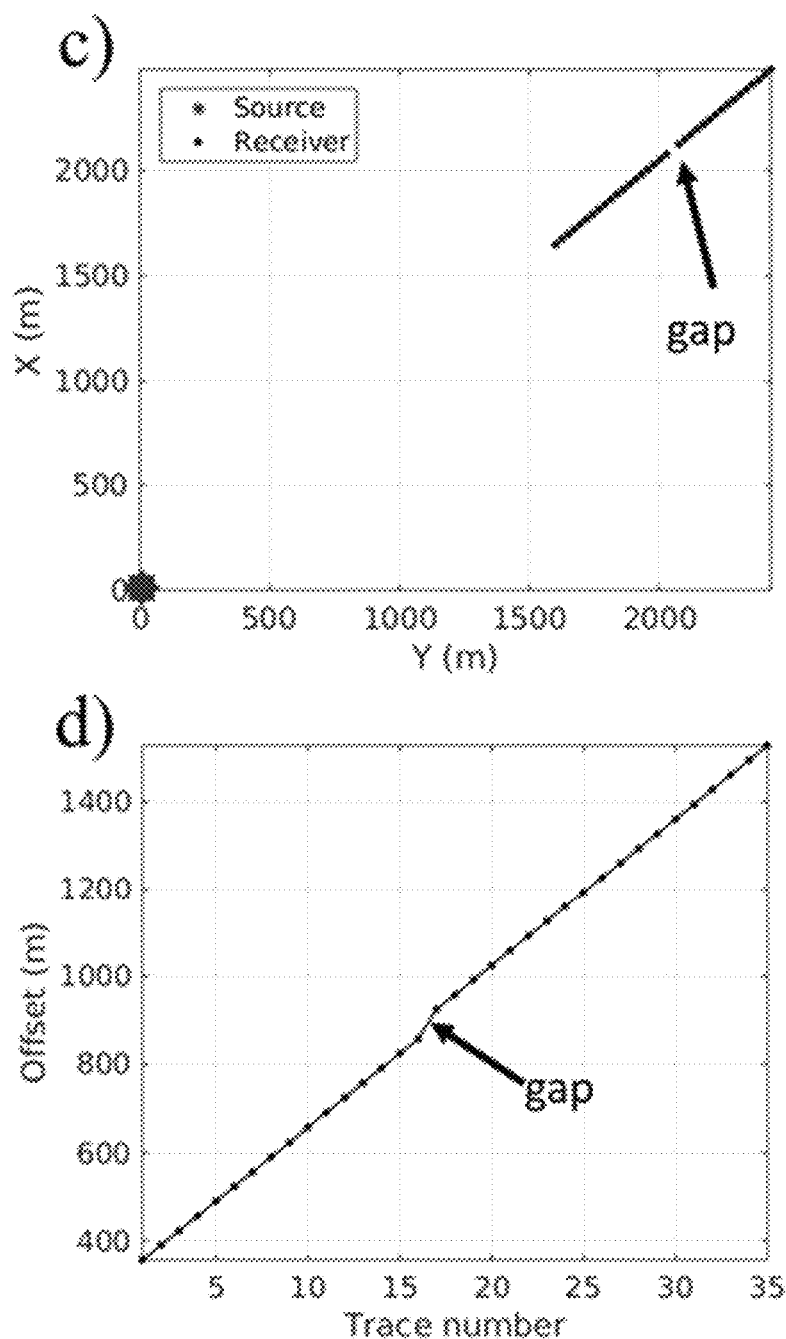

SURFACE WAVE PREDICTION AND REMOVAL FROM SEISMIC DATA

This application claims priority to U.S. Provisional Patent Application No. 62/717,456, entitled "Surface Wave Prediction and Removal from Seismic Data," filed Aug. 10, 2018, the entire contents of which are hereby incorporated by reference.

BACKGROUND

This disclosure pertains to seismic wave and data processing.

In seismic exploration of conventional and unconventional energy, a seismic source is used to create seismic waves that travel downward into the Earth and then bounce back by reservoir layers. These reflected waves carry important information about the subsurface oil and gas distribution as well as other natural resources. Unfortunately, the same seismic source generates not only reflected waves but also surface waves or ground rolls. The surface waves are viewed as noise in reflection seismic imaging and will degrade the quality of data.

Surface waves are energetic waves propagating along the Earth's surface. They are characterized by slow but frequency-dependent propagation velocities. In seismic data processing, surface waves and body waves are usually processed differently. Surface waves are useful for probing medium properties at shallow depths. In the processing of body waves, surface waves are usually considered as coherent noises that are required to be removed. In recent years, seismologists use dense seismic arrays to investigate shallow crustal structure with high resolution. To utilize body waves, suppressing surface waves while maintaining the data quality of body waves is important, such as extracting body waves from ambient-noise data recorded by a dense seismic array. Various approaches have been explored to achieve this goal. These methods fall into four broad categories: frequency filtering, domain transform based methods, coherence-based methods, and other methods.

Surfaces waves usually have lower frequencies than reflections. One of the most widely used surface wave removal method is to apply a bandpass filter to remove low-frequency surface waves. A similar method is a time derivative filter which suppresses low frequencies and boosts high frequencies. However, some reflection events may have similar frequencies to those of the surface waves and filtering in the frequency domain may damage these reflection events.

Because surface waves are usually characterized by slow apparent velocities and low frequencies, domain transformations were proposed to separate surface waves. These domain transformation methods include the frequency-wavenumber (f-k) transform, radial trace transform, tau-p transform, Radon transform, S transform, wavelet transform, sparse decomposition and local time-frequency decomposition. Many of these methods rely on regular receiver distribution which may not be the case for real data acquisition. These methods also frequently introduce aliasing and artifacts to the processed data.

Instead of suppressing surface waves in a different domain where they have different features compared to reflections, coherence-based methods aim to utilize the linear moveout to remove surface waves. These methods include interferometric removal, prediction error filters (PEF), plane-wave destruction filters, phase-matched filters, adaptive filters, and the Fourier correlation coefficient filter. Other alternative coherence-based methods try to flatten the reflections before removing the surface waves by various approaches. These approaches include the median filter, singular value decomposition (SVD), Karhunen-Loeve transformation, and coherence analyses. However, these coherence-based methods need auxiliary processing steps to estimate the moveout of reflections or surface waves. Additionally, they only perform effectively on nondispersive surface waves.

For spatially dense distribution of receivers, stacking can attenuate surface waves. However stacking may not be able to eliminate energetic surface waves recorded by sparsely distributed receivers. For multi-component seismic data, polarization analysis can suppress surface waves. When the dispersion information is available, dispersive surface waves can be un-dispersed into a narrow time window for better muting. However, muting compressed surface waves will still cause aliasing and introduce muting artifacts. If the near-surface model is available, surface waves could be computed based on the model and then be suppressed by adaptive subtraction. It has been proposed to suppress surface waves and refractions using a wavefield extrapolation approach. This method performs well when the seismic data have a good acquisition coverage and the near surface velocity model is known. Neural network analysis was also proposed to detect and suppress surface waves. A morphological component analysis has also been used to detect and remove surface waves. These analyses require prior training to learn the pattern of surface waves in seismic data.

SUMMARY

The present disclosure relates generally to processing seismic data. In particular, the present disclosure provides an approach for the extraction and suppression of surface waves while maintaining the quality of the useful reflection events.

Certain features of the present disclosure pertain to methods for processing seismic data recorded by dense seismic arrays for reflection seismology. The present methods are data-driven and involve first estimating high resolution surface wave phase velocities from recorded data using multi-channel nonlinear signal comparison (MNLSC). This enables the prediction of surface waves at each receiver location. Numerical prediction of the surface waves uses the recorded seismic traces based on the estimated phase velocities. The predicted surface waves are then subtracted or separated from the input seismic data.

Existing surface wave removal technologies commonly introduce fake signals which damage the other useful signals and have limited ability to handle irregular sampled data. The present methods include algorithms that can predict and remove surface waves using MNLSC, which can automatically produce reliable phase velocities of surface waves with high resolution. The methods are entirely data-driven. The present methods greatly remove surface waves without damaging other useful signals. The algorithms included in the present methods are flexible for use with irregular sampled data.

The present approach effectively predicts and separates surface waves from seismic data without damaging reflections.

BRIEF DESCRIPTION OF THE DRAWINGS

FIG. 1 shows (a) a Multi-layered model with Vp (P-wave velocity), Vs (shear wave velocity) and density, (b) recorded vertical-component displacements of the multimode Rayleigh waves, (c) a dispersion map created using Nonlinear signal comparison (NLSC), and (d) a comparison of the original input surface waves and predicted surface waves.

FIG. 2 shows (a) a multi-layered model with Vp, Vs and density, (b) a full-wave elastic synthetic shot gather containing surface waves and other types of waves, (c) predicted surface waves including the fundamental mode and first overtone Rayleigh waves, and (d) the shot gather after removing the surface waves.

FIG. 4 shows (a) a recorded raw seismic shot gather, (b) the shot gather after removing the surface waves, (c) the location of source and receivers, and (d) the offset for each trace, indicating a gap in the distribution of receivers.

DETAILED DESCRIPTION OF PREFERRED EMBODIMENTS

Figure 3C:
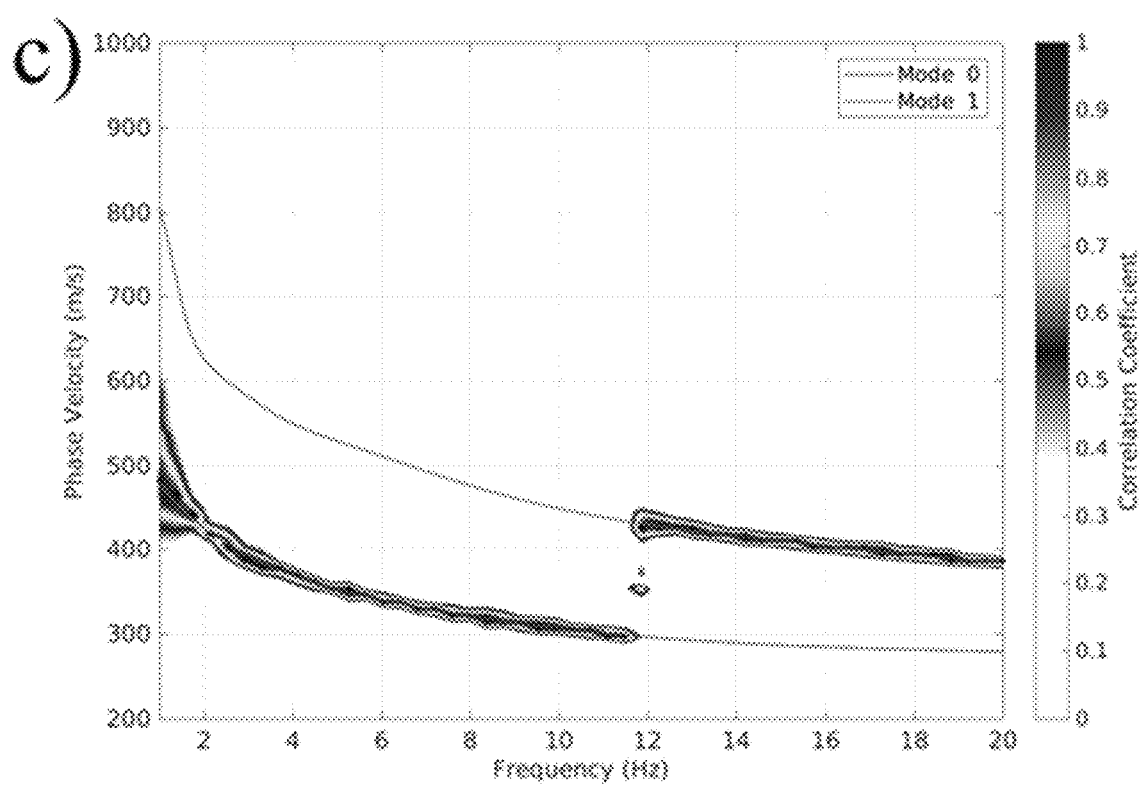
FIG. 3 shows (a) a comparison of predicted surface waves and modeled surface waves for fundamental mode Rayleigh wave, (b) a comparison of predicted surface waves and theoretical surface waves for first overtone Rayleigh wave, and (c) a dispersion map created using NLSC.

The present disclosure relates to methods for processing seismic data to remove surface waves. Preferred embodiments include a method to predict and separate dispersive surface waves based on dispersion estimation that is completely data-driven. Nonlinear signal comparison (NLSC) is used to obtain a high resolution and accurate dispersion. Then based on the dispersion, surface waves are predicted from the input data using phase shift. The predicted surface waves are then subtracted from the original data.

Preferred embodiments described herein include the use of a dispersion measurement based on NLSC to estimate frequency-dependent phase velocities from seismic data. The dispersion measurement considers two time (t)-domain seismic traces, $d_i(t)$ and $d_j(t)$, recorded by two geophones, the i-th and the j-th geophones. The distance between the two geophones is $x_{ij}$. The high-resolution dispersion map is obtained based on the nonlinear signal comparison (NLSC) described as:

$$S^{ij}_{NLSC}(\omega, V_{ph}; \sigma) = \frac{S^{ij}_{NL}(\omega, V_{ph}(\omega)) - S_\pi(\omega)}{1 - S_\pi(\omega)}$$

where $\omega$ and $V_{ph}(\omega)$ are the frequency and phase-velocity, respectively; $S_{NLSC}^{ij}$ is the normalized dispersion map using the ith and jth traces; $\sigma$ is a nonnegative parameter to control the resolution. As $\sigma \to \infty$, the NLSC becomes the traditional crosscorrelation. In the above equation, $S_{NL}^{ij}$ and $S_\pi$ are the unnormalized dispersion map and the reference value for normalization, respectively. They can be represented as:

$$S^{ij}_{NL}(\omega, V_{ph}) = \frac{1}{T}\int_0^T exp\left(-\frac{\left[\bar{d}_i(t;\omega) - \bar{d}_j\left(t + \frac{x_{ij}}{V_{ph}};\omega\right)\right]^2}{4\omega^2 \pi^{-2} \sigma^2}\right) dt$$

and $$S_\pi(\omega) = I_0(b)e^{-b}, \; b = \frac{\pi^2}{\sigma^2 \omega^2 T},$$

where $I_0$ is the modified Bessel function of the zero-th order. $\bar{d}_i$ and $\bar{d}_j$ are two traces normalized by its variance, which can be represented as:

$$\bar{d}_i(t;\omega) = \sigma_i^{-1} d_i(t;\omega), \; \bar{d}_j\left(t + \frac{x_{ij}}{V_{ph}};\omega\right) = \sigma_j^{-1} d_j\left(t + \frac{x_{ij}}{V_{ph}};\omega\right)$$

where $\sigma_i$ and $\sigma_j$ are the variances of the data defined as:

$$\sigma_i^2 = \int_0^T d_i^2(t;\omega)dt, \; \sigma_j^2 = \int_0^T d_j^2\left(t + \frac{x_{ij}}{V_{ph}};\omega\right)dt$$

where T is the length of the measured time window.

From the first equation above, the $S_{NLSC}^{ij}$ range is from 0 to 1. Under the special case $\sigma \to \infty$, $S_{NLSC}^{ij}$ will reduce to the traditional $S_{LSC}^{ij}$. The present $S_{NLSC}^{ij}$ has a uniform resolution over a wide band of frequencies and the resolution can be controlled by a single parameter $\sigma$. To apply the above dispersion analysis on the active surface seismic data with multiple channels, $S_{NLSC}^{ij}$ is averaged from all possible pairs of receivers to obtain the final dispersion map.

Importantly, the present methods produce uniform high resolution dispersion at both low and high frequencies. The traditional cross-correlation based dispersion measurement technique is a special use of the NLSC method. The NLSC method allows for the estimation of phase velocities using algorithms by first picking the local maximum at each frequency. Once the phase velocities have been picked, the surface waves can be estimated at each receiver location using phase shift and local stacking. For simplification, it is assumed that the receivers are distributed along a line in the x-direction. The surface wave is predicted using:

$$u_{surf}^{pred}(x;\omega) = \frac{1}{A}\sum_{dx_i=-L}^{L} a_i u(x+dx_i;\omega) exp\left[i\omega \frac{dx_i}{v_{ph}(\omega)}\right],$$

$$A = \sum_{dx_i=-L}^{L} a_i,$$

where $u_{surf}^{pred}(x;\omega)$ is the predicted surface wave at the receiver located at x in the frequency $\omega$ domain; $u(x+dx_i;\omega)$ is the recorded seismic trace at location $x+dx_i$ which includes both surface waves and body waves; L is a local spatial window size around x;

$$exp\left[i\omega \frac{dx_i}{v_{ph}(\omega)}\right]$$

is the phase shift operator to correct for surface wave propagation effect; $v_{ph}(\omega)$ is the estimated phase velocity from NLSC dispersion measurement; and $a_i$ is a weighting factor that can be referred as the local wave reconstruction operation. Using the equation above, the surface waves can be predicted at each receiver location using its neighboring traces. Finally, the predicted surface waves are subtracted from the original data.

Preferred embodiments of the data-driven surface-wave removal method include three steps. First, extract surface wave phase velocities using NLSC technique. Second, predict the surface waves at each receiver location using the estimated phase velocities and neighboring traces from the original seismic data. Third, subtract the predicted surface waves from the original data.

Example 1

This example utilized a synthetic seismic shot gather containing only surface waves. In this example, the near-surface velocity model (Xia et al. 1999) was used to show the performance of embodiments of the present method in the prediction of surface waves. FIG. 1(a) shows a Multi-layered model with Vp (P-wave velocity), Vs (shear wave velocity) and density. The synthetic seismic shot gather was generated using the method by Herrmann (2013), which allows for modeling of only surface waves. FIG. 1(b) shows recorded vertical-component displacements of the multi-mode Rayleigh waves. There were 46 traces recorded on the surface every 2 m between offsets from 10 m to 100 m. The source was an explosive source, located at a horizontal distance of 0 m and at a depth of 10 m. The recording time was 1.024 s, sampled at 1 ms. The frequency band was from 3 Hz to 70 Hz. The modeled seismic data contained multi-mode surface waves, including the fundamental mode and overtones. The dispersion analysis was performed using the NLSC. FIG. 1(c) shows the dispersion map using the traces in FIG. 1(b) via the NLSC (with $\sigma=0.01$). The three dash lines are the theoretical dispersion curves for the fundamental mode (mode 0), the first overtone (mode 1), and the second overtone (mode 2), respectively. The black dot at each frequency shows the picked local maximum of the dispersion map, which indicates the phase velocity. The black bar shows the range of points with values above 95% of the picked local maximum. From the dispersion map (FIG. 1(c)), phase velocities can be picked at different frequencies. Based on the measured phase velocities from the NLSC dispersion map, the surface waves were predicted using the equation above. The predicted surface waves were in excellent agreement with the recorded surface waves in both phase and amplitude. FIG. 1(d) shows a comparison of the original input surface waves and predicted surface waves. From this example, it was observed that that the present methods can predict the dispersive surface waves, including multiple modes, by using only the recorded data.

Example 2

This example utilized a synthetic seismic shot gather using elastic full wavefield. The second synthetic data was modeled using the spectral element method (SEM) (e.g., Komatitsch and Vilotte 1998, Komatitsch and Tromp 2002) by solving the full elastic wave equation. The computational model and shot gathers are shown in FIGS. 2(a) and 2(b), respectively. FIG. 2(a) shows a multi-layered model with Vp, Vs and density. At shallow depths, there were several thin layers to approximate a velocity gradient. At depths of 500 m and 1000 m, two strong reflective interfaces exist. In FIG. 2(b), both surface waves as well as reflected/refracted/converted waves are observed. FIG. 2(b) shows a full-wave elastic synthetic shot gather containing surface waves and other types of waves. FIG. 3(c) shows a dispersion map of the traces in FIG. 2(b) via the NLSC (with $\sigma=0.002$). The two solid lines are theoretical dispersion curves for the fundamental mode (mode 0) and the first overtone (mode 1), respectively. FIG. 2(c) shows the predicted surface waves including the fundamental mode and first overtone Rayleigh waves. The surface waves in FIG. 2(c) were predicted by using dispersion measured for both the fundamental mode and the first overtone (Zheng and Hu, 2017) then following the procedure described above. FIG. 2(d) shows the shot gather after removing the surface waves. There were 101 surface receivers from offset 500 m to 1500 m at 10 m spacing and a depth of 10 m. The recording time length was 5 s. The time sampling interval was 1 ms. The source was an explosive source with a 15 Hz Ricker wavelet, located at a horizontal distance of 300 m and a depth of 30 m. Two circles in FIGS. 2(b) and 2(d) indicate where surface waves interfered with reflections for comparison. After removing the predicted surface waves (as in FIG. 2(d)), it is noted that reflection signals were not damaged by the present method, even at places where the reflections interfered with surface waves. Reflections become more visible after surface wave removal, which is noted by comparing the waveforms within the red circles in FIGS. 2(b) and 2(d).

To verify the fidelity of the predicted surface waves, surface waves were modeled for the fundamental mode and first overtone using the method by Herrmann (2013) and the results were compared to the surface waves predicted using the current methods. FIG. 3(a) shows a comparison of predicted surface waves and modeled surface waves for fundamental mode Rayleigh wave. FIG. 3(b) shows a comparison of predicted surface waves and theoretical surface waves for first overtone Rayleigh wave. From FIGS. 3(a) and 3(b), it is noted that predicted surface waves well match the modeled surface waves in both the fundamental mode and the first overtone. From this full elastic synthetic data test, it is noted that the present method can correctly predict the surface waves from data containing other types of waves. Furthermore, the present method can remove surface waves but without damaging useful signals.

Example 3

This example utilized field data, namely a field shot gather from a land acquisition survey. FIG. 4(a) shows the recorded raw seismic shot gather. FIG. 4(b) shows the shot gather after removing the surface waves. There were 35 traces with offsets from 356 m to 1529 m on the surface. The recording time was 1.5 s and the time sampling interval was 2 ms. The red ellipse indicates regions where surface waves interfered with the reflections. The distribution of trace has a gap at 17th trace. There was a lateral discontinuity in the surface wave moveout resulting from the irregular distribution of geophones. FIG. 4(c) shows the location of source and receivers. FIG. 4(d) shows the offset for each trace, indicating a gap in the distribution of receivers. FIG. 4(b) shows that the surface waves have been effectively removed (e.g., data within the circle). The surface wave removal algorithm can handle the irregularity because the surface wave removal method is locally performed. Because this method can effectively remove surface waves from field data with irregular geometry, it provides many potential benefits for processing real data.

The examples above show the successful application of the data-driven surface wave removal approach on three datasets, including two synthetic shot gathers and one field shot gather. All of these examples show that the present method is capable of predicting and suppressing surface waves from the data without damaging the reflections.

REFERENCES

The following documents and publications are hereby incorporated by reference.

Alsdorf, D. 1997, Noise reduction in seismic data using Fourier correlation coefficient filtering. Geophysics, 62, no. 5, 1617-1627. doi: 10.1190/1.1444264.

Alyahya, K. M. 1991, Application of the partial karhunen-loeve transform to suppress random noise in seismic sections. Geophysical Prospecting, 39, no. 1, 77-93. doi: 10.1111/j.1365-2478.1991.tb00302.x.

Angerer, R. H., B. H. Berrong, A. T. Long, and G. S. Gassaway. 1987, OMNIPHONE POLARIZATION FILTERING—AN EFFECTIVE WAY OF REMOVING GROUND ROLL WITHOUT GEOPHONE ARRAYS. Geophysics, 52, no. 5, 705-705.

Askari, R., and H. R. Siahkoohi. 2008, Ground roll attenuation using the S and x-f-k transforms. Geophysical Prospecting, 56, no. 1, 105-114. doi: 10.1111/j.1365-2478.2007.00659.x.

Beresford-Smith, G., and R. N. Rango. 1988, Dispersive noise removal in tx space: Application to Arctic data. Geophysics, 53, no. 3, 346-358.

Boiero, D. 2015, Modeling and filtering coherent noise in seismic surveys. Google Patents.

Brown, M., R. G. Clapp, and K. Marfurt. 1999, Predictive coherent noise suppression of 3-D ground roll. SEP report.

Canales, L. L. 1984, Random noise reduction, SEG Technical Program Expanded Abstracts 1984: Society of Exploration Geophysicists. 525-527.

Chambers, R. E., G. A. Sitton, and J. Paffenholz. 1996, Method of reducing noise in seismic signals by adaptive filtering of a noise reference. Google Patents.

Chen, H. F., X. Y. Li, Z. P. Qian, and G. L. Zhao. 2013, Robust adaptive polarization analysis method for eliminating ground roll in 3C land seismics. Applied Geophysics, 10, no. 3, 295-304. doi: 10.1007/s11770-013-0386-0.

Claerbout, J. 1975, Slant-stacks and radial traces: Stanford Exploration Project report.

Claerbout, J. F. 1992, Earth soundings analysis: Processing versus inversion. Vol. 6: Blackwell Scientific Publications.

De-Ying, W., and L. Yun. 2016, Phase-shift- and phase-filtering-based surface-wave suppression method. Applied Geophysics, 13, no. 4, 614-620. doi: 10.1007/s11770-016-0594-5.

Deighan, A. J., and D. R. Watts. 1997, Ground-roll suppression using the wavelet transform. Geophysics, 62, no. 6, 1896-1903. doi: 10.1190/1.1444290.

Duncan, G., and G. Beresford. 1995, Median filter behaviour with seismic data. Geophysical prospecting, 43, no. 3, 329-345.

Embree, P., J. P. Burg, and M. M. Backus. 1963, Wide-band velocity filtering—The pie-slice process. Geophysics, 28, no. 6, 948-974.

Fomel, S. 2002, Applications of plane-wave destruction filters. Geophysics, 67, no. 6, 1946-1960.

Freire, S. L. M., and T. J. Ulrych. 1988, Application of singular value decomposition to vertical seismic profiling. Geophysics, 53, no. 6, 778-785. doi: 10.1190/1.1442513.

Goebel, V. 1985, Polarization and ground roll suppression. Geophysics, 50, no. 7, 1202-1202.

Goforth, T., and E. Herrin. 1979, Phase-matched filters—application to the study of love waves. Bulletin of the Seismological Society of America, 69, no. 1, 27-44.

Goudarzi, A. R., and M. A. Riahi. 2012, Adaptive seismic ground roll attenuation using the double density dual tree discrete wavelet transform (DWT) method. Earth Sciences Research Journal, 16, no. 2, 31-38.

Grubb, H. J., and A. T. Walden. 1997, Characterizing seismic time series using the discrete wavelet transform. Geophysical Prospecting, 45, no. 2, 183-205. doi: 10.1046/j.1365-2478.1997.00346.x.

Gulunay, N. 1986, FXDECON and complex Wiener prediction filter, SEG Technical Program Expanded Abstracts 1986: Society of Exploration Geophysicists. 279-281.

Halliday, D., P. Bilsby, L. West, E. Kragh, and J. Quigley. 2015, Scattered ground-roll attenuation using model-driven interferometry. Geophysical Prospecting, 63, no. 1, 116-132. doi: 10.1111/1365-2478.12165.

Halliday, D. F., A. Curtis, P. Vermeer, C. Strobbia, A. Glushchenko, D. J. van Manen, and J. O. A. Robertsson. 2010, Interferometric ground-roll removal: Attenuation of scattered surface waves in single-sensor data. Geophysics, 75, no. 2, SA15-SA25. doi: 10.1190/1.3360948.

Hemon, C., and D. Mace. 1978, Use of the karhunen—loeve transformation in seismic data-processing. Geophysical Prospecting, 26, no. 3,600-626. doi: 10.1111/j.1365-2478.1978.tb01620.x.

Henley, D. C. 2003, Coherent noise attenuation in the radial trace domain. Geophysics, 68, no. 4, 1408-1416. doi: 10.1190/1.1598134.

Herrin, E., and T. Goforth. 1977, Use of the karhunen—loeve transformation in seismic data-processing. Bulletin of the Seismological Society of America, 67, no. 5, 1259-1275.

Herrmann, R. B. 2013, Computer Programs in Seismology: An Evolving Tool for Instruction and Research. Seismological Research Letters, 84, no. 6, 1081-1088. doi: 10.1785/0220110096.

Herrmann, R. B., and D. Russell. 1990, Ground roll: Rejection using adaptive phase-matched filters. Geophysics, 55, no. 6, 776-781.

Hosseini, S. A., A. Javaherian, H. Hassani, S. Torabi, and M. Sadri. 2015a, Adaptive attenuation of aliased ground roll using the shearlet transform. Journal of Applied Geophysics, 112, 190-205. doi: 10.1016/j.jappgeo.2014.11.018.

Hosseini, S. A., A. Javaherian, H. Hassani, S. Torabi, and M. Sadri. 2015b, Shearlet transform in aliased ground roll attenuation and its comparison with f-k filtering and curvelet transform. Journal of Geophysics and Engineering, 12, no. 3, 351-364. doi: 10.1088/1742-2132/12/3/351.

Hu, H., Y. K. Liu, A. Osen, and Y. C. Zheng. 2015, Compression of local slant stacks by the estimation of multiple local slopes and the matching pursuit decomposition. Geophysics, 80, no. 6, Wd175-Wd187.

Hu, Y., L. Wang, F. Cheng, Y. Luo, C. Shen, and B. Mi. 2016, Ground-roll noise extraction and suppression using high-resolution linear Radon transform. Journal of Applied Geophysics, 128, 8-17. doi: 10.1016/j.jappgeo.2016.03.007.

Komatitsch, D., and J. Tromp. 2002, Spectral-element simulations of global seismic wave propagation—II. Three-dimensional models, oceans, rotation and self-gravitation. Geophysical Journal International, 150, no. 1, 303-318. doi: DOI 10.1046/j.1365-246X.2002.01716.x.

Komatitsch, D., and J. P. Vilotte. 1998, The spectral element method: An efficient tool to simulate the seismic response of 2D and 3D geological structures. Bulletin of the Seismological Society of America, 88, no. 2, 368-392.

Lin, F. C., D. Z. Li, R. W. Clayton, and D. Hollis. 2013, High-resolution 3D shallow crustal structure in Long Beach, Calif.: Application of ambient noise tomography on a dense seismic array. Geophysics, 78, no. 4, Q45-Q56.

Liu, G. C., S. Fomel, L. Jin, and X. H. Chen. 2009, Stacking seismic data using local correlation. Geophysics, 74, no. 3, V43-V48. doi: 10.1190/1.3085643.

Liu, X. W. 1999, Ground roll supression using the Karhunen-Louve transform. Geophysics, 64, no. 2, 564-566. doi: 10.1190/1.1444562.

Liu, Y., and S. Fomel. 2013, Seismic data analysis using local time-frequency decomposition. Geophysical Prospecting, 61, no. 3, 516-525. doi: 10.1111/j.1365-2478.2012.01062.x.

McMechan, G. A., and R. Sun. 1991, Depth filtering of first breaks and ground roll. Geophysics, 56, no. 3, 390-396. doi: 10.1190/1.1443056.

McMechan, G. A., and M. J. Yedlin. 1981, Analysis of dispersive waves by wave field transformation. Geophysics, 46, no. 6, 869-874.

Melo, P. E. M., M. J. Porsani, and M. G. Silva. 2009, Ground-roll attenuation using a 2D time-derivative filter. Geophysical Prospecting, 57, no. 3, 343-353. doi: 10.1111/j.1365-2478.2008.00740.x.

Morse, P. F., and G. F. Hildebrandt. 1989, Ground-roll suppression by the stackarray. Geophysics, 54, no. 3, 290-301.

Mortazavi, S. A., and A. Javaherian. 2013, The Effect of Signal-to-Noise Ratio on Ground Roll Attenuation Using Adaptive Singular Value Decomposition: A Case Study from the South West of Iran. Journal of Seismic Exploration, 22, no. 5, 427-447.

Naghadeh, D. H., and C. K. Morley. 2016, Ground roll attenuation using SVD and time-frequency-wavenumber filters. Journal of Geophysics and Engineering, 13, no. 5. doi: 10.1088/1742-2132/13/5/657.

Nakata, N., J. P. Chang, J. F. Lawrence, and P. Boue. 2015, Body wave extraction and tomography at Long Beach, Calif., with ambient-noise interferometry. Journal of Geophysical Research-Solid Earth, 120, no. 2, 1159-1173.

Pinnegar, C. R., and D. W. Eaton. 2003, Application of the S transform to prestack noise attenuation filtering. Journal of Geophysical Research-Solid Earth, 108, no. B9. doi: 10.1029/2002jb002258.

Porsani, M. J., M. G. Silva, P. E. M. Melo, and B. Ursin. 2010, SVD filtering applied to ground-roll attenuation. Journal of Geophysics and Engineering, 7, no. 3, 284-289.

Rastegar, S. A. F., A. Javaherian, N. K. Farajkhah, M. S. Monfared, and A. Zarei. 2016, Ground-roll attenuation using modified common-offset-common-reflection-surface stacking. Applied Geophysics, 13, no. 2, 353-363. doi: 10.1007/s11770-016-0529-1.

Russell, B., D. Hampson, and J. Chun. 1990a, Noise elimination and the Radon transform, part 1. The Leading Edge, 9, no. 10, 18-23.

Russell, B., D. Hampson, and J. Chun. 1990b, Noise elimination and the Radon transform, part 2. The Leading Edge, 9, no. 11, 31-37.

Schieck, D. G. 1994, Rayleigh-wave analysis and removal using a novel weighted median filter: Geology and Geophysics, University of Calgary.

Shieh, C. F., and R. B. Herrmann. 1990, Ground roll—rejection using polarization filters. Geophysics, 55, no. 9, 1216-1222. doi: 10.1190/1.1442937.

Soares, P. L. B., J. P. Silva, and M. D. Santos. 2015, Artificial neural networks applied to reduce the noise type of ground roll. Journal of Seismic Exploration, 24, no. 1, 1-14.

Song, Y.-Y., and R. R. Stewart. 1993, Ground roll rejection via fv filtering, SEG Technical Program Expanded Abstracts 1993: Society of Exploration Geophysicists. 1322-1325.

Stockwell, R. G., L. Mansinha, and R. P. Lowe. 1996, Localization of the complex spectrum: The S transform. Ieee Transactions on Signal Processing, 44, no. 4, 998-1001. doi: 10.1109/78.492555.

Strobbia, C., A. Laake, P. Vermeer, and A. Glushchenko. 2011, Surface waves: use them then lose them. Surface-wave analysis, inversion and attenuation in land reflection seismic surveying. Near Surface Geophysics, 9, no. 6, 503-514. doi: 10.3997/1873-0604.2011022.

Strobbia, C., A. Zarkhidze, R. May, J. Quigley, and P. Bilsby. 2011, Model-based coherent noise attenuation for complex dispersive waves, SEG Technical Program Expanded Abstracts 2011: Society of Exploration Geophysicists. 3571-3575.

Strobbia, C. L. 2011, Modeling and filtering coherent noise in seismic surveying. Google Patents.

Tan, Y. Y., C. He, Y. D. Wang, and Z. Zhao. 2013, Ground roll attenuation using a time-frequency dependent polarization filter based on the S transform. Applied Geophysics, 10, no. 3, 279-294. doi: 10.1007/s11770-013-0383-3.

Tiapkina, O., M. Landro, Y. Tyapkin, and B. Link. 2012, Single-station SVD-based polarization filtering of ground roll: Perfection and investigation of limitations and pitfalls. Geophysics, 77, no. 2, V41-V59. doi: 10.1190/geo2011-0040.1.

Turner, G. 1990, Aliasing in the tau-p transform and the removal of spatially aliased coherent noise. Geophysics, 55, no. 11, 1496-1503.

Van der Baan, M., and C. Jutten. 2000, Neural networks in geophysical applications. Geophysics, 65, no. 4, 1032-1047.

Verma, S., S. Guo, T. Ha, and K. J. Marfurt. 2016, Highly aliased ground-roll suppression using a 3D multiwindow Karhunen-Loeve filter: Application to a legacy Mississippi Lime survey. Geophysics, 81, no. 1, V79-V88. doi: 10.1190/geo2014-0442.1.

Wang, W., J. H. Gao, W. C. Chen, and J. Xu. 2012, Data adaptive ground-roll attenuation via sparsity promotion. Journal of Applied Geophysics, 83, 19-28. doi: 10.1016/j.jappgeo.2012.04.004.

Wang, W. L., W. Y. Yang, X. J. Wei, and X. He. 2017, Ground roll wave suppression based on wavelet frequency division and radial trace transform. Applied Geophysics, 14, no. 1, 96-104. doi: 10.1007/s11770-017-0595-z.

Xia, J. H., R. D. Miller, and C. B. Park. 1999, Estimation of near-surface shear-wave velocity by inversion of Rayleigh waves. Geophysics, 64, no. 3, 691-700. doi: 10.1190/1.1444578.

Xu, X. H., G. Z. Qu, Y. Zhang, Y. Y. Bi, and J. J. Wang. 2016, Ground-roll separation of seismic data based on morphological component analysis in two-dimensional domain. Applied Geophysics, 13, no. 1, 116-126. doi: 10.1007/s11770-016-0546-0.

Yilmaz, O. 2001, Seismic data analysis: Processing, inversion, and interpretation of seismic data: Society of exploration geophysicists.

Zheng, J. J., X. Y. Yin, G. Z. Zhang, G. H. Wu, and Z. S. Zhang 2010, The surface wave suppression using the second generation curvelet transform. Applied Geophysics, 7, no. 4, 325-335. doi: 10.1007/s11770-010-0257-x.

Zheng, Y., and H. Hu. 2017, Nonlinear Signal Comparison and High-Resolution Measurement of Surface-Wave Dispersion. Bulletin of the Seismological Society of America.

What is claimed is:

1. A method for processing seismic data to remove interference from surface waves prior to analysis of the seismic data in connection with seismic exploration of subsurface energy sources, comprising:

obtaining and recording input multi-channel seismic data from a plurality of receivers located near a subsurface feature, wherein the input multi-channel seismic data comprises a plurality of recorded seismic traces at a plurality of locations near the receivers;

generating estimated surface wave phase velocities from the input multi-channel seismic data using nonlinear signal comparison (NLSC), wherein the step of generating estimated surface wave phase velocities comprises using the following equation:

$$S_{NLSC}^{ij}(\omega, V_{ph}; \sigma) = \frac{S_{NL}^{ij}(\omega, V_{ph}(\omega)) - S_\pi(\omega)}{1 - S_\pi(\omega)},$$

wherein $\omega$ is frequency, $V_{ph}(\omega)$ is phase-velocity, $S_{NLSC}^{ij}$ is a normalized dispersion map using ith and jth traces, $\sigma$ is a nonnegative parameter to control resolution, $S_{NL}^{ij}$ is an unnormalized dispersion map represented by:

$$S_{NL}^{ij}(\omega, V_{ph}) = \frac{1}{T}\int_0^T \exp\left(-\frac{\left[\overline{d}_i(t;\omega) - \overline{d}_j\left(t + \frac{x_{ij}}{V_{ph}}; \omega\right)\right]^2}{4\omega^2 \pi^{-2} \sigma^2}\right) dt,$$

wherein T is the length of the measured time window, $\overline{d}_i$ and $\overline{d}_j$ are recorded seismic traces normalized by variance and represented as:

$$\overline{d}_i(t;\omega) = \sigma_i^{-1} d_i(t;\omega), \overline{d}_j\left(t + \frac{x_{ij}}{V_{ph}};\omega\right) = \sigma_j^{-1} d_j\left(t + \frac{x_{ij}}{V_{ph}};\omega\right),$$

wherein $\sigma_i$ and $\sigma_j$ are variances defined as:

$$\sigma_i^2 = \int_0^T d_i^2(t;\omega)dt, \sigma_j^2 = \int_0^T d_j^2\left(t + \frac{x_{ij}}{V_{ph}};\omega\right)dt,$$

and $S_\pi$ is a reference value for normalization represented by:

$S_\pi(\omega) = I_0(b)e^{-b}$ wherein $$b = \frac{\pi^2}{\sigma^2 \omega^2 T}$$

and $I_0$ is a modified Bessel function of zero-th order;

generating predicted surface waves for each receiver by using the estimated surface wave phase velocities and performing a phase shift and local stacking analysis for seismic traces at locations near each receiver;

subtracting the predicted surface waves from the input multi-channel seismic data to generate seismic data lacking interference from surface waves; and analyzing the seismic data lacking interference from surface waves to provide information about the subsurface feature, wherein the subsurface feature is an energy source.

2. The method of claim 1, wherein the step of generating predicted surface waves for each receiver comprises using the following equation:

$$u_{surf}^{pred}(x;\omega) = \frac{1}{A}\sum_{dx_i=-L}^{L} a_i u(x + dx_i;\omega)\exp\left[i\omega \frac{dx_i}{V_{ph}(\omega)}\right],$$

wherein $u_{surf}^{pred}(x;\omega)$ is the predicted surface wave at a receiver located at x in frequency $\omega$ domain, $$A = \sum_{dx_i=-L}^{L} a_i,$$

wherein $a_i$ is a weighting factor and L is a local spatial window size around x, $u(x+dx_i;\omega)$ is a recorded seismic trace at location $x+dx_i$ including surface waves and body waves, $$\exp\left[i\omega \frac{dx_i}{V_{ph}(\omega)}\right]$$

is a phase shift operator to correct for surface wave propagation effect, and $V_{ph}(\omega)$ is estimated surface wave phase velocity generated using nonlinear signal comparison (NLSC).

3. The method of claim 1, wherein the subsurface feature is an oil or gas reservoir.

4. A method for predicting surface waves in seismic data to facilitate their removal from the seismic data prior to analysis of the seismic data in connection with seismic exploration of subsurface energy sources, comprising:

obtaining and recording input multi-channel seismic data from a plurality of receivers located near a subsurface feature, wherein the input multi-channel seismic data comprises a plurality of recorded seismic traces at a plurality of locations near the receivers;

generating estimated surface wave phase velocities from the input multi-channel seismic data using nonlinear signal comparison (NLSC), wherein the step of generating estimated surface wave phase velocities comprises using the following equation:

$$S_{NLSC}^{ij}(\omega, V_{ph}; \sigma) = \frac{S_{NL}^{ij}(\omega, V_{ph}(\omega)) - S_\pi(\omega)}{1 - S_\pi(\omega)},$$

wherein $\omega$ is frequency, $V_{ph}(\omega)$ is phase-velocity, $S_{NLSC}^{ij}$ is a normalized dispersion map using ith and jth traces, $\sigma$ is a nonnegative parameter to control resolution, $S_{NL}^{ij}$ is an unnormalized dispersion map represented by:

$$S_{NL}^{ij}(\omega, V_{ph}) = \frac{1}{T}\int_0^T \exp\left(-\frac{\left[\overline{d}_i(t;\omega) - \overline{d}_j\left(t + \frac{x_{ij}}{V_{ph}}; \omega\right)\right]^2}{4\omega^2 \pi^{-2} \sigma^2}\right) dt,$$

wherein T is the length of the measured time window, $\overline{d}_i$ and $\overline{d}_j$ are recorded seismic traces normalized by variance and represented as:

$$\overline{d}_i(t;\omega) = \sigma_i^{-1} d_i(t;\omega), \overline{d}_j\left(t + \frac{x_{ij}}{V_{ph}};\omega\right) = \sigma_j^{-1} d_j\left(t + \frac{x_{ij}}{V_{ph}};\omega\right),$$

wherein $\sigma_i$ and $\sigma_j$ are variances defined as:

$$\sigma_i^2 = \int_0^T d_i^2(t;\omega)dt, \sigma_j^2 = \int_0^T d_j^2\left(t + \frac{x_{ij}}{V_{ph}};\omega\right)dt,$$

and
$S_\pi$ is a reference value for normalization represented by:

$$S_\pi(\omega) = I_0(b)e^{-b},$$

wherein $$b = \frac{\pi^2}{\sigma^2 \omega^2 T}$$

and $I_0$ is a modified Bessel function of zero-th order;
generating predicted surface waves for each receiver by using the estimated surface wave phase velocities and performing a phase shift and local stacking analysis for seismic traces at locations near each receiver; and
using the predicted surface waves in connection with analysis of the seismic data to provide information about the subsurface feature, wherein the subsurface feature is an energy source.

5. The method of claim 4, wherein the step of generating predicted surface waves for each receiver comprises using the following equation:

$$u_{surf}^{pred}(x;\omega) = \frac{1}{A} \sum_{dx_i=-L}^{L} a_i u(x + dx_i;\omega)\exp\left[i\omega \frac{dx_i}{V_{ph}(\omega)}\right],$$

wherein $u_{surf}^{pred}(x;\omega)$ is the predicted surface wave at a receiver located at x in frequency $\omega$ domain, $$A = \sum_{dx_i=-L}^{L} a_i,$$

wherein $a_i$ is a weighting factor and L is a local spatial window size around x,
$u(x+dx_i;\omega)$ is a recorded seismic trace at location $x+dx_i$ including surface waves and body waves, $$\exp\left[i\omega \frac{dx_i}{V_{ph}(\omega)}\right]$$

is a phase shift operator to correct for surface wave propagation effect, and
$v_{ph}(\omega)$ is estimated surface wave phase velocity generated using nonlinear signal comparison (NLSC).

6. The method of claim 4, wherein the subsurface feature is an oil or gas reservoir.

* * * * *

UNITED STATES PATENT AND TRADEMARK OFFICE
CERTIFICATE OF CORRECTION

PATENT NO. : 11,880,011 B2
APPLICATION NO. : 17/267555
DATED : January 23, 2024
INVENTOR(S) : Yingcai Zheng et al.

It is certified that error appears in the above-identified patent and that said Letters Patent is hereby corrected as shown below:

In the Specification

1. In Column 4, Line 14, delete "σ→∞." and insert -- σ→∞, --, therefor.

2. In Column 4, Line 55, delete "a$_i$" and insert -- α$_i$ --, therefor.

3. In Column 10, Line 57, delete "Zhang" and insert -- Zhang. --, therefor.

In the Claims

4. In Column 11, Line 35, in Claim 1, delete
"$\bar{d}_i(t;\omega) - \sigma_i^{-1} d_i(t;\omega), \bar{d}_j\left(t + \frac{x_{ij}}{V_{ph}};\omega\right) = \sigma_j^{-1} d_j\left(t + \frac{x_{ij}}{V_{ph}};\omega\right),$" and insert -- $\bar{d}_i(t;\omega) = \sigma_i^{-1} d_i(t;\omega), \bar{d}_j\left(t + \frac{x_{ij}}{V_{ph}};\omega\right) = \sigma_j^{-1} d_j\left(t + \frac{x_{ij}}{V_{ph}};\omega\right),$ --, therefor.

5. In Column 11, Line 49, in Claim 1, delete "$S_\pi(\omega)=I_0(b)e^{-b}$" insert -- $S_\pi(\omega)=I_0(b)e^{-b}$, --, therefor.

6. In Column 12, Line 18, in Claim 2, delete "a$_i$" and insert -- α$_i$ --, therefor.

7. In Column 13, Line 5, in Claim 4, delete
"$\bar{d}_i(t;\omega) - \sigma_i^{-1} d_i(t;\omega), \bar{d}_j\left(t + \frac{x_{ij}}{V_{ph}};\omega\right) = \sigma_j^{-1} d_j\left(t + \frac{x_{ij}}{V_{ph}};\omega\right),$" and insert Signed and Sealed this
Fourth Day of June, 2024

*Katherine Kelly Vidal*
Katherine Kelly Vidal
*Director of the United States Patent and Trademark Office*

CERTIFICATE OF CORRECTION (continued)
U.S. Pat. No. 11,880,011 B2

$$\overline{d}_i(t;\omega) = \sigma_i^{-1} d_i(t;\omega), \overline{d}_j\left(t + \frac{x_{ij}}{V_{ph}};\omega\right) = \sigma_j^{-1} d_j\left(t + \frac{x_{ij}}{V_{ph}};\omega\right),$$

-- --, therefor.

8. In Column 14, Line 18, in Claim 5, delete "$a_i$" and insert -- $α_i$ --, therefor.